United States Patent
Chang

(10) Patent No.: US 9,873,967 B2
(45) Date of Patent: Jan. 23, 2018

(54) CONTROL METHOD FOR SYNCHRONIZED FABRIC CIRCULATION IN CONVEYOR DRIVE FABRIC DYEING MACHINE

(71) Applicant: Chi-Lung Chang, Taoyuan (TW)

(72) Inventor: Chi-Lung Chang, Taoyuan (TW)

( * ) Notice: Subject to any disclaimer, the term of this patent is extended or adjusted under 35 U.S.C. 154(b) by 417 days.

(21) Appl. No.: 14/556,236

(22) Filed: Dec. 1, 2014

(65) Prior Publication Data

US 2016/0153130 A1    Jun. 2, 2016

(51) Int. Cl.
*D06B 3/00* (2006.01)
*D06B 3/36* (2006.01)
*D06B 3/24* (2006.01)
*G05B 15/02* (2006.01)
*B32B 5/00* (2006.01)
*C14B 7/00* (2006.01)

(52) U.S. Cl.
CPC .......... *D06B 3/36* (2013.01); *B32B 5/00* (2013.01); *C14B 7/00* (2013.01); *D06B 3/24* (2013.01); *G05B 15/02* (2013.01)

(58) Field of Classification Search
None
See application file for complete search history.

(56) References Cited

U.S. PATENT DOCUMENTS

| | | | | |
|---|---|---|---|---|
| 4,081,976 A | * | 4/1978 | Moreinis-Eisen | D06B 15/10 118/53 |
| 4,578,965 A | * | 4/1986 | Brossman | D06B 11/0059 118/323 |
| 4,829,793 A | * | 5/1989 | Holder | D06B 11/0063 118/315 |
| 5,469,720 A | * | 11/1995 | Paggi | D06B 3/28 226/118.1 |

* cited by examiner

*Primary Examiner* — Paul Yanchus, III
(74) *Attorney, Agent, or Firm* — Leong C. Lei

(57) ABSTRACT

Disclosed is a control method for synchronized fabric circulation in a conveyer drive fabric dyeing machine. During a dyeing process of fabric, the fabric is driven by a fabric guide to move in a circulating manner and the time period for a cycle of circulation is set in consistency with the time period that a conveyor moving from a rear end to a front end so as to achieve synchronization that makes the circulation smooth. The control method is performed with a computer or a PLC control unit that is supplied with fabric length data or fabric weight data and fabric unit weight data and, based on such data, performs an automatic operation of computation and supply of a signal to speed controllers of the fabric guide motor and the conveyor motor to set the speeds thereof at a predetermined ratio with respect to each other for synchronized operations.

3 Claims, 2 Drawing Sheets

US 9,873,967 B2

CONTROL METHOD FOR SYNCHRONIZED FABRIC CIRCULATION IN CONVEYOR DRIVE FABRIC DYEING MACHINE

TECHNICAL FIELD OF THE INVENTION

The present invention generally relates to a conveyor drive fabric dyeing machine that is used to dye rope-like fabric, and more particularly to a control method for achieving operation synchronization of fabric and a fabric guide and a conveyor.

DESCRIPTION OF THE PRIOR ART

FIG. 1 shows a structure of a conveyor drive fabric dyeing machine, which comprises a machine body 1 in which a dyeing tube 12, a fabric guide 4, and a conveyor 2 are arranged. The fabric guide 4 is driven to rotate by a fabric guide motor (not shown). The conveyor 2 is driven and operated by a conveyor motor (not shown).

The principle of operation is as follows. Fabric 3 moves around the fabric guide 4 and passes through a nozzle 5 to enter the dyeing tube 12 and then falls onto the conveyor 2 to complete a cycle of circulation. Dye liquid L is pressurized by a pump 7 to flow through a heat exchanger 8 (for heating or cooling) to enter the nozzle 5 for generating a jetting or overflowing hydraulic power that drives the fabric 3 into the dyeing tube 12. The fabric 3 that exits the dyeing tube 12 is allowed to fall back to the conveyor 2 and the conveyor 2 conveys the fabric 3 forward to pass through an idler 41 and the fabric guide 4 to repeatedly proceed with the above-described circulation cycle. In such a circulation cycle, a control box 9 controls the operation and dye and chemical agents are supplied from a service tank 11 and pressurized by the pump 7 to feed into a dye liquid circulation loop of the dyeing machine. During the circulation, the dye liquid L and the fabric 3 undergo a process of heating, temperature holding, and cooling achieved with the heat exchanger 8 to have the dye absorbed by the fabric thereby achieving a dyeing effect of scouring, coloring, color fixing, and water rinsing.

The conveyor 2 and the fabric guide 4 are respectively driven by the conveyor motor (not shown) and the fabric guide motor (not shown) to operate, while the fabric is driven by the fabric guide 4 to move. During the process of circulation, the time period that the fabric needs for each cycle of circulation must be identical to the time period that the conveyor takes to move from a rear end to a front end. In other words, the two must be operated in a synchronous manner, otherwise fabric entangling or jamming may result. Practically, the length or weight of fabric for each dyeing batch would be different so that the adjustment for synchronization is generally time consuming and difficult and oftentimes, poor machine operation or low operation efficiency result.

SUMMARY OF THE INVENTION

An object of the present invention is to overcome the problem of unsmooth conveyance of fabric resulting from operation speeds of fabric driven by fabric guide and a conveyor of a dyeing machine being hard to be in synchronization with each other during a circulation cycle.

To overcome such a problem, a computer or a programmable logic controller (PLC) control unit is included to automatically operate for computation and supply of a signal, based on data of fabric length or fabric weight and data of fabric unit weight fed to the computer or control unit, to a speed controller (such as an inverter) of a fabric guide motor and a speed controller (such as an inverter) of a conveyor motor so as to make the fabric guide motor and the conveyor motor rotate together with speeds that are of a predetermined ratio with respect to each other so that the speeds of the fabric and the conveyor are synchronized with each other and the circulation of the fabric can be performed smoothly.

An advantage of the present invention is that it is not necessary to fix the length of fabric to be dyed and, regardless the length and weight of the fabric, the computer or PLC control unit performs automatic computation and controls the fabric guide and the conveyor and the fabric to achieve operation synchronization so as to make the circulation and conveyance of the fabric smooth and the operation of the machine is automatized, simplified, capable of greatly increasing production performance.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Figure 1:
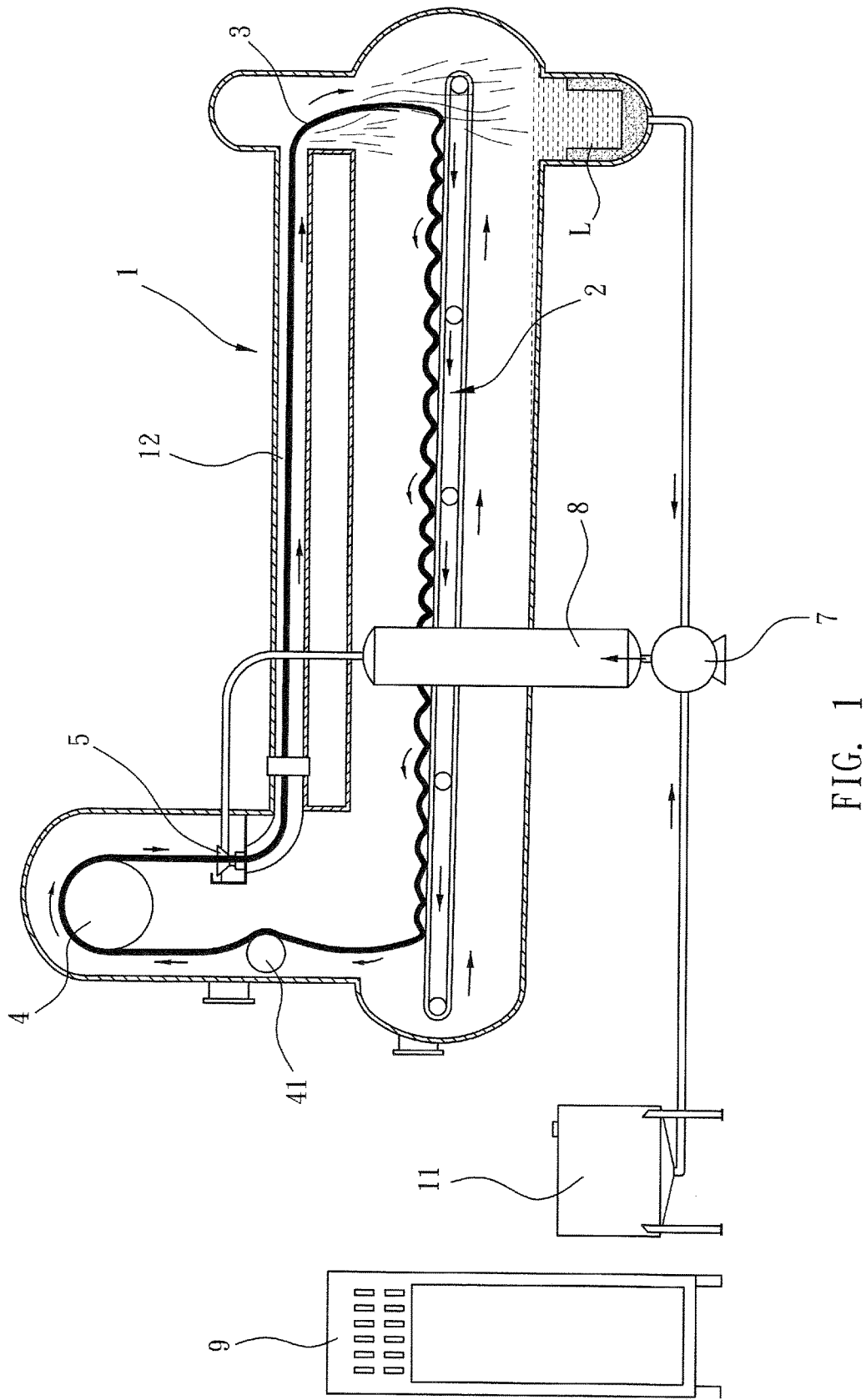
FIG. 1 is a schematic view illustrating a conveyor drive fabric dyeing machine.

The present invention provides a control method that is applicable to a fabric dyeing machine shown in FIG. 1. The fabric dyeing machine comprises a machine body 1 in which a dyeing tube 12, a fabric guide 4, and a conveyor 2 are arranged. The fabric guide 4 is driven to rotate by a fabric guide motor (not shown). The conveyor 2 is driven and operated by a conveyor motor (not shown). Fabric 3 moves around the fabric guide 4 and passes through a nozzle 5 to enter the dyeing tube 12 and then falls onto the conveyor 2 to be conveyed forward so as to complete a cycle of circulation. Dye liquid L is pressurized by a pump 7 to flow through a heat exchanger 8 (for heating or cooling) to enter the nozzle 5 for generating a jetting or overflowing hydraulic power that drives the fabric 3 into the dyeing tube 12. The fabric 3 that exits the dyeing tube 12 is allowed to fall back to the conveyor 2 and the conveyor 2 conveys the fabric 3 forward to pass through an idler 41 and the fabric guide 4 to repeat the above-described circulation cycle. In such a circulation process, a control box 9 controls the operation. The control box 9 comprises a computer or a programmable logic controller (PLC) control unit 91 mounted therein. Dye and chemical agents are supplied from a service tank 11 and pressurized by the pump 7 to feed into a dye liquid circulation loop of the dyeing machine. During the circulation, the dye liquid L and the fabric 3 undergo a process of heating, temperature holding, and cooling achieved with the heat exchanger 8 to have the dye absorbed by the fabric thereby achieving a dyeing effect of scouring, coloring, color fixing, and water rinsing.

Figure 2:
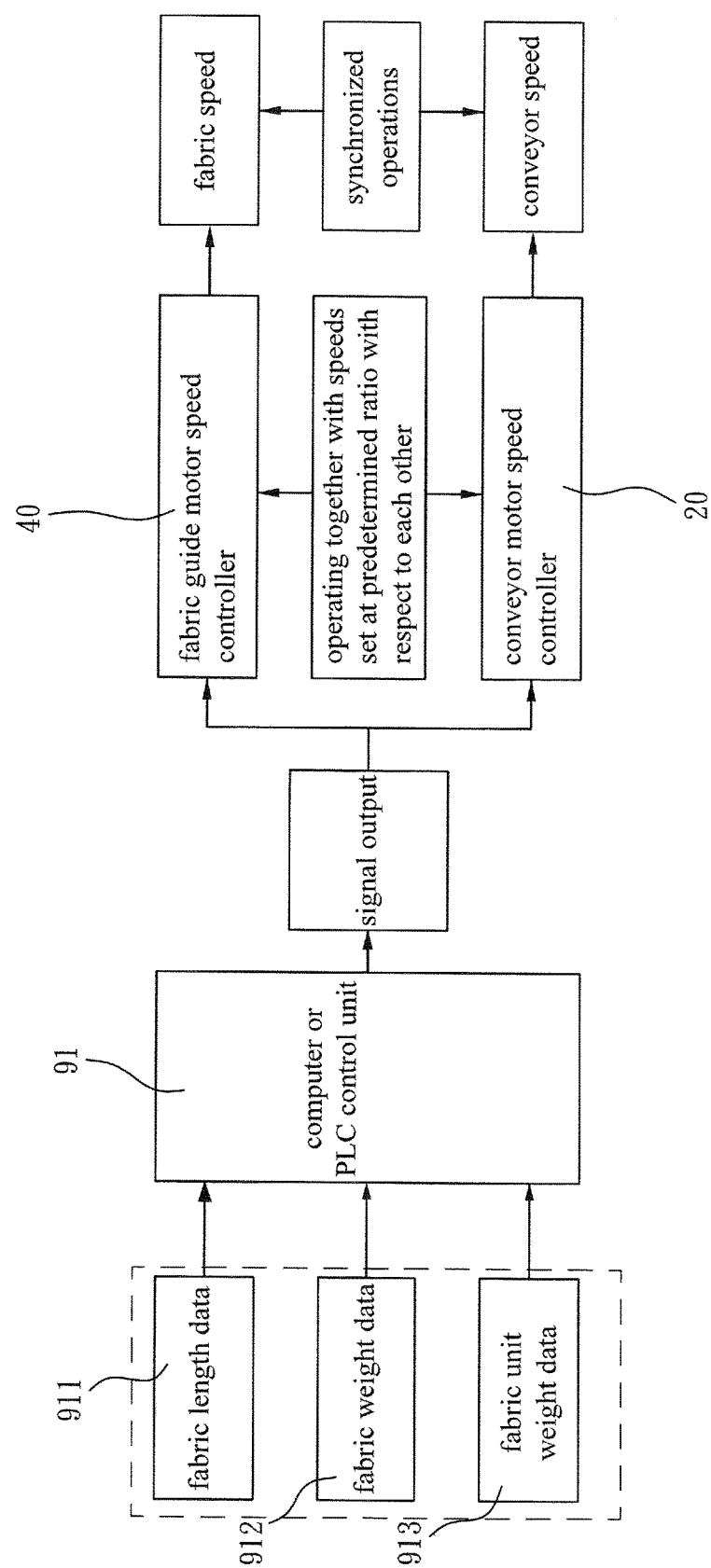
FIG. 2 is a schematic view illustrating a control method according to the present invention.

As shown in FIG. 2, the technical solution of the present invention is that the control box 9 is provided with the computer or the PLC control unit 91 built therein in such a way that the compute or PLC control unit 91 is electrically connected to a speed controller of a fabric guide motor 40 and a speed controller of a conveyor motor 20. The computer or PLC control unit 91 are fed with fabric length data 911 or fabric weight data 912 and fabric unit weight data 913, based on which an automatic operation is performed by the computer or the PLC control to compute and supply a signal to the speed controller (such as an inverter) of the fabric guide motor 40 and the speed controller (such as an inverter) of the conveyor motor 20 so as to make the fabric guide motor 40 and the conveyor motor 20 rotate together with speeds that are of a predetermined ratio with respect to each other so that the fabric 3 is driven by the fabric guide 4 to move in a manner of being in synchronization with the operation of the conveyor 2.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. A control method for synchronized fabric circulation in a conveyer drive fabric dyeing machine, wherein the conveyor drive fabric dyeing machine comprises a machine body in which a dyeing tube, a fabric guide, and a conveyor are arranged, which are adapted to move fabric in a circulating manner through the machine body such that the fabric is conveyed forward by the conveyor operated at a linear forwarding speed to pass through an idler and subsequently taken up by the fabric guide that is operated at an operational speed and moved into the dyeing tube that is located above the conveyor to fall back onto the conveyor to carry out a dyeing process of the fabric, the control method comprising the following steps:

providing a computer or a programmable logic controller (PLC) control unit that is in connection with a first speed controller and a second speed controller that are respectively and electrically connected with a fabric guide motor of the fabric dyeing machine that drives the fabric guide to operate at the operational speed and a conveyor motor of the fabric dyeing machine that drives the conveyor to move at the linear forwarding speed, supplying the computer or PLC control unit with data of the fabric, performing an automatic operation of computation based on such data so as to generate a signal, and supplying the signal to the first speed controller of the fabric guide motor and the second speed controller of the conveyor motor to make the fabric guide motor and the conveyor motor rotate together with speeds that are of a predetermined ratio with respect to each other so that the operational speed of the fabric guide and the linear forwarding speed of the conveyor are adjusted according to the signal generated on the basis of the data to have a moving speed of the fabric and the operational speed of the fabric guide and the linear forwarding speed of the conveyor in synchronization with each other to prevent entangling or jamming of the fabric.

2. The control method according to claim 1, wherein the data of the fabric comprises fabric length.

3. The control method according to claim 1, wherein the data of the fabric comprise fabric weight and unit weight of the fabric.

* * * * *